(12) United States Patent
Mahajan et al.

(10) Patent No.: US 7,640,272 B2
(45) Date of Patent: Dec. 29, 2009

(54) USING AUTOMATED CONTENT ANALYSIS FOR AUDIO/VIDEO CONTENT CONSUMPTION

(75) Inventors: Milind Mahajan, Redmond, WA (US); Patrick Nguyen, Seattle, WA (US); Alejandro Acero, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 271 days.

(21) Appl. No.: 11/635,153

(22) Filed: Dec. 7, 2006

(65) Prior Publication Data
US 2008/0140385 A1 Jun. 12, 2008

(51) Int. Cl.
*G06F 7/00* (2006.01)
*G06F 17/00* (2006.01)
(52) U.S. Cl. ............... 707/104.1; 725/136; 725/149
(58) Field of Classification Search ............... 725/136, 725/149; 704/275, 270, 243; 709/203; 358/1.15; 348/14.12; 707/104.1
See application file for complete search history.

(56) References Cited

U.S. PATENT DOCUMENTS

| | | | | |
|---|---|---|---|---|
| 6,553,345 B1 * | 4/2003 | Kuhn et al. | ............... | 704/275 |
| 6,643,620 B1 * | 11/2003 | Contolini et al. | ............ | 704/270 |
| 7,047,554 B1 * | 5/2006 | Lortz | ............... | 725/149 |
| 7,508,535 B2 * | 3/2009 | Hart et al. | ............... | 358/1.15 |
| 2003/0018475 A1 * | 1/2003 | Basu et al. | ............... | 704/270 |
| 2003/0225825 A1 * | 12/2003 | Healey et al. | ............... | 709/203 |
| 2005/0010409 A1 * | 1/2005 | Hull et al. | ............... | 704/243 |
| 2005/0243166 A1 * | 11/2005 | Cutler | ............... | 348/14.12 |
| 2005/0243168 A1 * | 11/2005 | Cutler | ............... | 348/14.12 |
| 2007/0118873 A1 * | 5/2007 | Houh et al. | ............... | 725/136 |

OTHER PUBLICATIONS

Konstantinos Koumpis and Steven Renals; "Content-Based Access to Spoken Audio"; Sep. 2005; IEEE Signal Processing Magazine.*

* cited by examiner

*Primary Examiner*—John E Breene
*Assistant Examiner*—Giovanna Colan
(74) *Attorney, Agent, or Firm*—Westman, Champlin & Kelly, P.A.

(57) ABSTRACT

Audio/video (A/V) content is analyzed using speech and language analysis components. Metadata is automatically generated based upon the analysis. The metadata is used in generating user interface interaction components which allow a user to view subject matter in various segments of the A/V content and to interact with the A/V content based on the automatically generated metadata.

8 Claims, 13 Drawing Sheets

USING AUTOMATED CONTENT ANALYSIS FOR AUDIO/VIDEO CONTENT CONSUMPTION

BACKGROUND

It has long been predicted that audio/video (A/V) technology will converge with personal computing, mobile, and Internet technology. In fact, the convergence of A/V consumption with Internet technology is well underway. Therefore, there is an increasing awareness that the personal computer could become the main entertainment center in the home.

However, current technologies suffer from some difficulties that preclude them from realizing the full potential of this phenomenon. For instance, when a user typically searches the Internet for textual results, there are often textual summaries generated for these results. This allows a user to quickly gauge the relevance of the results. Even when there are no summaries, a user can quickly browse textual content to determine its relevance. Unlike text, A/V content can hardly be analyzed at a glance. Therefore, discovering new content, gauging the relevance of search results, or browsing content, becomes difficult.

Also, A/V content analysis is a non-trivial problem. It often requires very complex and accurate speech recognition and language analysis technologies. Therefore, in the past, tools available for interacting with A/V content have been limited to simply re-creating the experience on previous generation devices, such as radio, television, and video cassette recorder (VCR) devices. Thus, the tools have generally included functions such as play, fast forward, reverse and stop. These tools are simply not very effective in giving the user the ability to discover, navigate, and consume very large amounts of available A/V content.

These types of limitations have led to the current approaches in making content available online. The content has been largely provided at one of two extremes. The first is to provide A/V content as a short (e.g., one minute) A/V clip which has relatively rich metadata. The second is to provide A/V content as a regular (e.g., 30-60 minute) show which offers little more than the traditional, linear A/V consumption experience.

Some current methodologies which attempt to address these problems include conventional keyword search methodologies. Searching summaries of A/V content, or other metadata relative to A/V content, for keywords partially addresses the issues of discoverability of the content. However, keyword searching of A/V content alone is not enough. It still leaves many obstacles. Evaluation of relevance of the A/V content that surfaces through a search is also non-trivial given the opacity and the linear nature of the A/V content, itself. That is, A/V content is not easily digestible at a glance in a visual snapshot, as is text, for instance, and it is also consumed linearly which makes it time consuming to sample.

The discussion above is merely provided for general background information and is not intended to be used as an aid in determining the scope of the claimed subject matter.

SUMMARY

Audio/video (A/V) content is analyzed using speech and language analysis components. Metadata is automatically generated based upon the analysis. The metadata is used in generating user interface interaction components which allow a user to view subject matter in various segments of the A/V content and to interact with the A/V content based on the automatically generated metadata.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
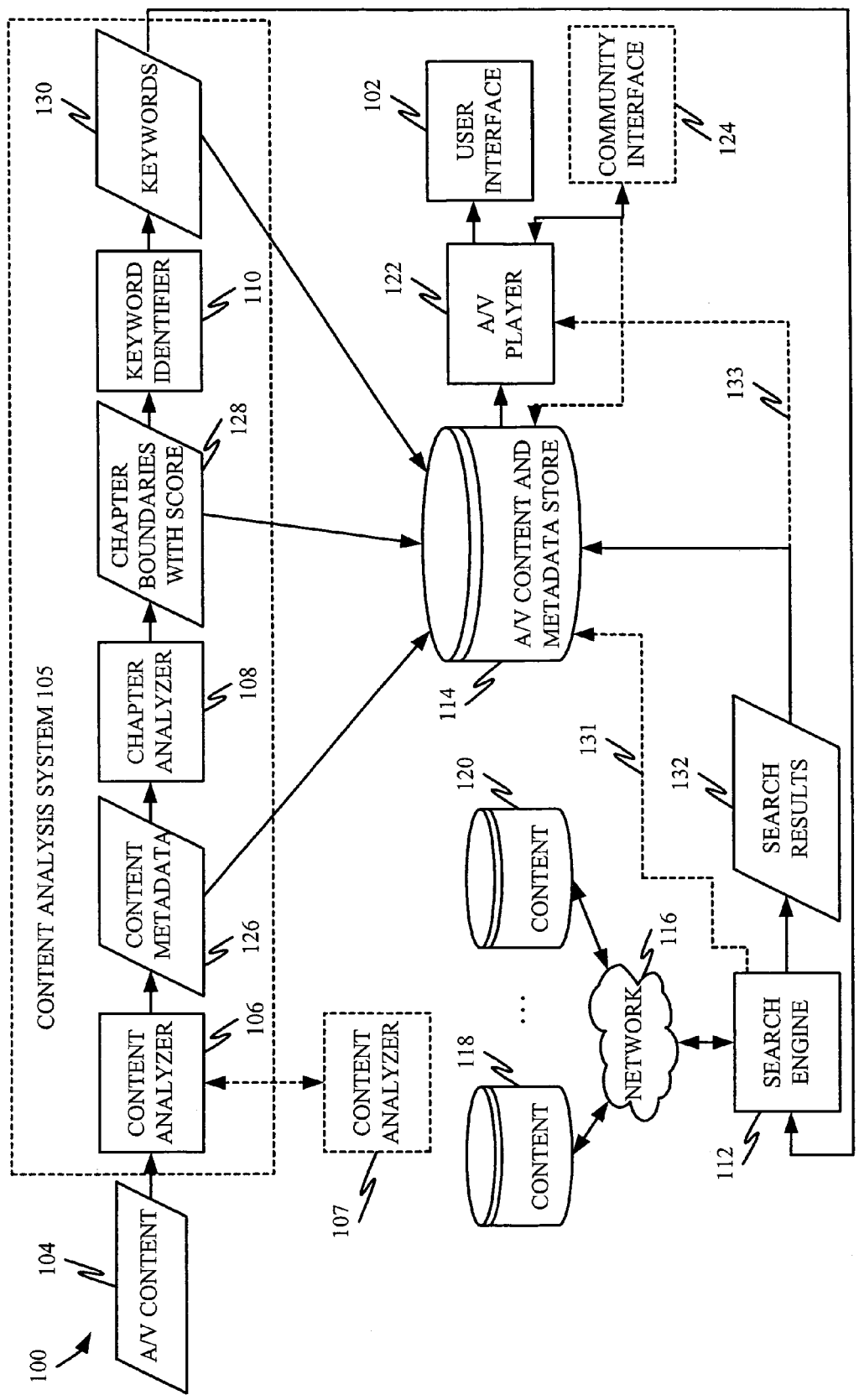
FIG. 1 is a block diagram of one illustrative audio/video (A/V) content analysis system.

FIG. 1 is a block diagram of one illustrative A/V metadata generator system 100 that is used to generate user interface 102. User interface 102 allows a user to quickly review A/V content 104 and to interact with A/V content 104 that is input into system 100. System 100 is shown having content analysis system 105 that includes content analyzer 106, chapter analyzer 108, and keyword identifier 110. System 100 also includes search engine 112, and A/V content and metadata store 114. Of course, while these things are shown as separate components, they (or their functions) can be combined in any desired way.

System 100 is also shown connected through network 116 (which is illustratively a wide area network such as the Internet) to a plurality of other content stores 118 and 120, although a wide variety of additional content stores may be available through network 116 as well. System 100 also shows A/V player 122 that accesses A/V content and metadata in store 114 and generates user interface 102 (and optionally user interface 124 which is described below) for use by a user.

Figure 2:
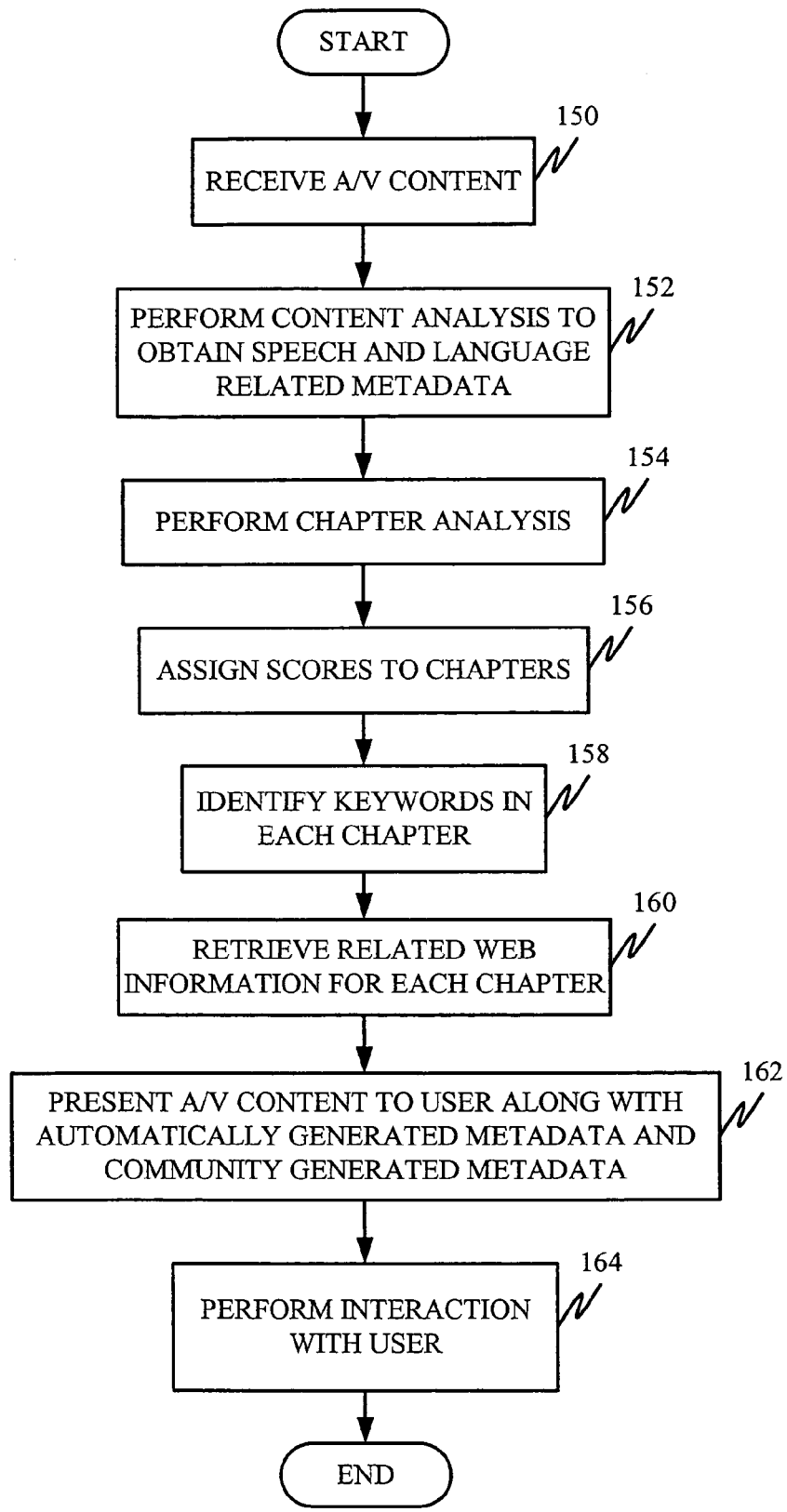
FIG. 2 is a flow diagram illustrating one illustrative embodiment of the operation of the system shown in FIG. 1.

FIG. 2 is a flow diagram illustrating one illustrative embodiment of the operation of system 100 shown in FIG. 1. First, content analyzer 106 receives A/V content 104. This is indicated by block 150 in FIG. 2. Content analyzer 106 then performs content analysis to obtain speech and language related metadata from A/V content 104. This is indicated by block 152 in FIG. 2. It will be noted that FIG. 1 shows that A/V content 104 can be split by content analyzer 106 into multiple pieces which can be sent to one or more additional content analyzers 107 for analysis. This speeds up analysis by distributing the analysis computations among various content analyzers. Of course, the content analyzers 106-107 can be located on different computers, across a local or wide area network, or all content can be analyzed by a single analyzer.

Figure 4:
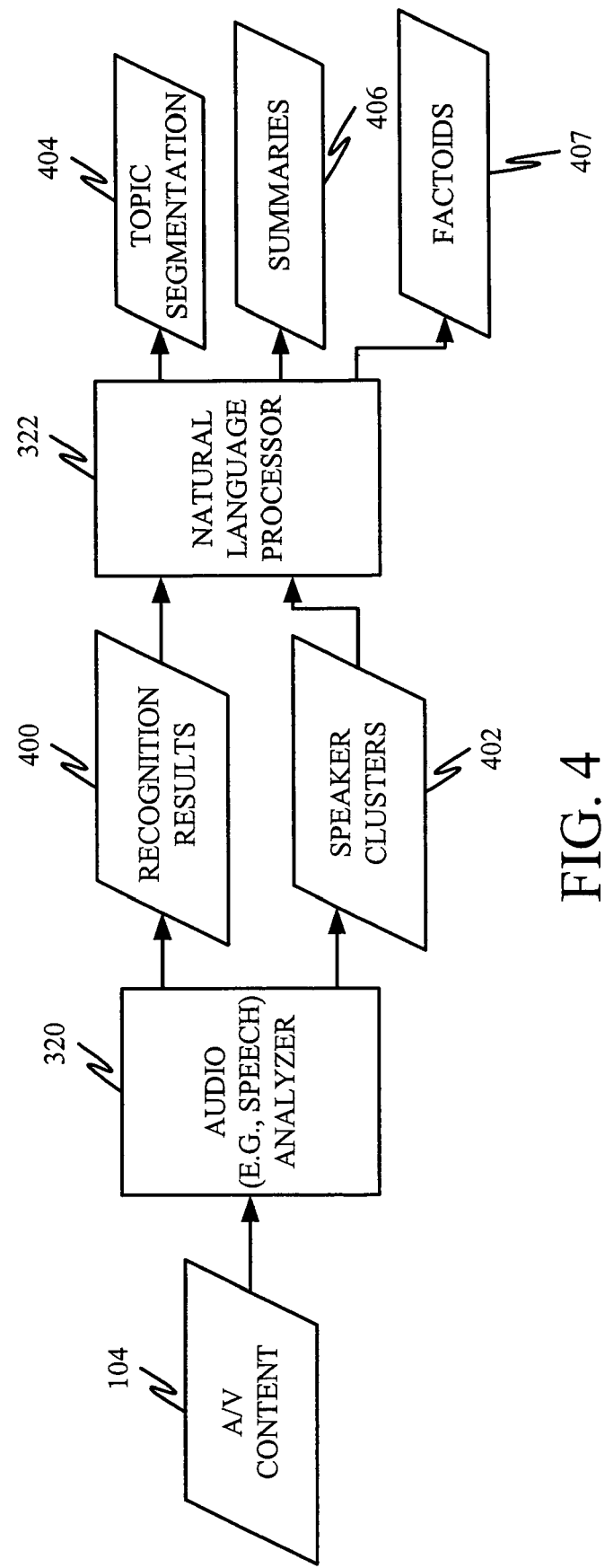
FIG. 4 is a block diagram of one embodiment of a content analyzer using speech recognition technology and natural language processing technology.
Figure 5:
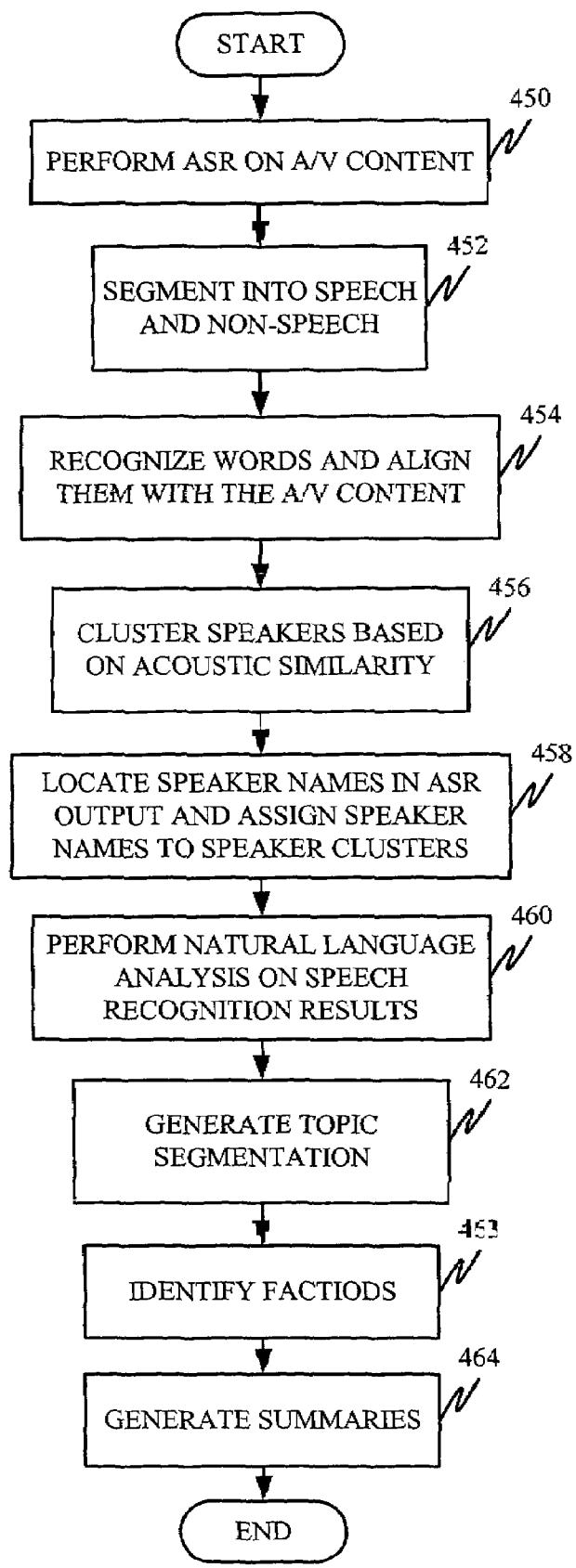
FIG. 5 is a flow diagram illustrating one illustrative embodiment of content analysis.

In any case, the A/V content 104 is analyzed by content analyzer 106 to obtain speech and language related metadata. In one illustrative embodiment, content analyzer 106 (and optionally content analyzer 107) uses any desired video analyzer, scene analysis mechanisms, speech recognizers, speaker segmentation components, topic segmentation components, and summarization components, in order to perform content analysis. FIGS. 4 and 5 illustrate the operation of one embodiment of content analyzer 106 in more detail below. Suffice it to say, for now, that, in one embodiment, different speakers are identified in the A/V content 104 and metadata is generated indicating at what point each speaker is speaking in the A/V content.

The content analysis generates content metadata 126 that is illustratively provided to chapter analyzer 108. The content metadata 126 is also illustratively stored in metadata store 114.

Chapter analyzer 108 receives the content metadata 126 and automatically segments the A/V content 104 into segments, based on the metadata 126, and assigns labels to each segment. The segments can be based on topics, subject matter, speakers, etc.

In one embodiment, in order to segment A/V content 104, chapter analyzer 108 performs a chapter analysis, based on metadata 126, to identify various points in the A/V content that can be considered chapter boundaries. This is indicated by block 154 in FIG. 2. This type of chapter analysis creates an organization for the A/V content 104.

In one illustrative embodiment, each of the possible chapter boundaries identified by chapter analyzer 108 is assigned a score by chapter analyzer 108. Assigning the score is indicated by block 156 in FIG. 2. The score is indicative of how confident chapter analyzer 108 is that the proposed chapter boundary is actually a point in A/V content 104 that should be identified as a chapter. It is likely that those possible chapter boundaries in which chapter analyzer 108 is highly confident will be fewer than those possible chapter boundaries in which chapter analyzer 108 has a lower confidence. Therefore, the A/V content 104 can be displayed with chapters of different granularity, based upon how confident the user wishes the chapter boundaries to be. This is also described in greater detail below. The chapter boundaries, along with their scores, are indicated by block 128 in FIG. 1, and they can also be stored in metadata store 114.

The A/V content 104, along with the various metadata generated to this point, is provided to keyword identifier 110. Keyword identifier 110 then identifies keywords in each of the chapters identified by chapter analyzer 108. Identifying the keywords is indicated by block 158 in FIG. 2. In one illustrative embodiment, the keywords are identified by tagging them as keywords using any desired mechanism, such as term frequency and inverse document frequency (tf*idf). However, other keyword identification mechanisms can be used as well. The keywords are indicated by block 130 in FIG. 1 and they can be stored in metadata store 114 as well.

Once the keywords are identified, they are provided to search engine 112. Search engine 112 can be any desired information retrieval search engine configured to search, through network 116, various sources of content 118 and 120. In the illustrative embodiment, search engine 112 simply searches the content based on the identified keywords and returns search results 132 based on the search. In another embodiment, search engine 112 performs the search while (or just before) the A/V content 104 is played by a user. In that case, keywords 130 are stored in store 114 and retrieved by search engine 112 as needed, for searching. The results are then provided either back to store 114 or directly to player 122. This is indicated by arrows 131 and 133.

In one illustrative embodiment, the search results 132 comprise actual documents or content. In another embodiment, search results 132 comprise hyperlinks to the content identified as relevant to the search. As is described later, the links can be selected by the user to navigate to the relevant content. Retrieving related web information (search results 132) for each chapter is indicated by block 160 in FIG. 2. The search results 132 can be stored in metadata store 114 as well.

Once the various items of metadata have been generated and stored in store 114, along with A/V content 104, an A/V player 122 (which can be any desired A/V player that recognizes the metadata in store 114) accesses the A/V content and its associated metadata and presents the A/V content to the user by generating user interface 102, along with metadata driven displays based on the automatically generated metadata.

It should also be noted that, as is described in greater detail below, community metadata can be received (such as community comments regarding the A/V content 104, ratings regarding the A/V content 104, etc.), and the community metadata can be presented to the user as well through the community interface 124. In addition, the community annotations can be used to train, re-transcribe, re-segment, or adapt the content or content analyzer. In any case, community interface 124 can be part of user interface 102, or it can be separate therefrom, as desired. In any case, presenting the A/V content along with the metadata driven displays and community metadata driven displays to the user is indicated by block 162 in FIG. 2.

Once presented to the user, the user can then interact with the A/V content through the user interface 102 or 124. A number of examples of user interaction are described below with respect to FIGS. 2A, 6, and 8. Performing interaction functions through the user interface is indicated by block 164 in FIG. 2.

Figure 2A:
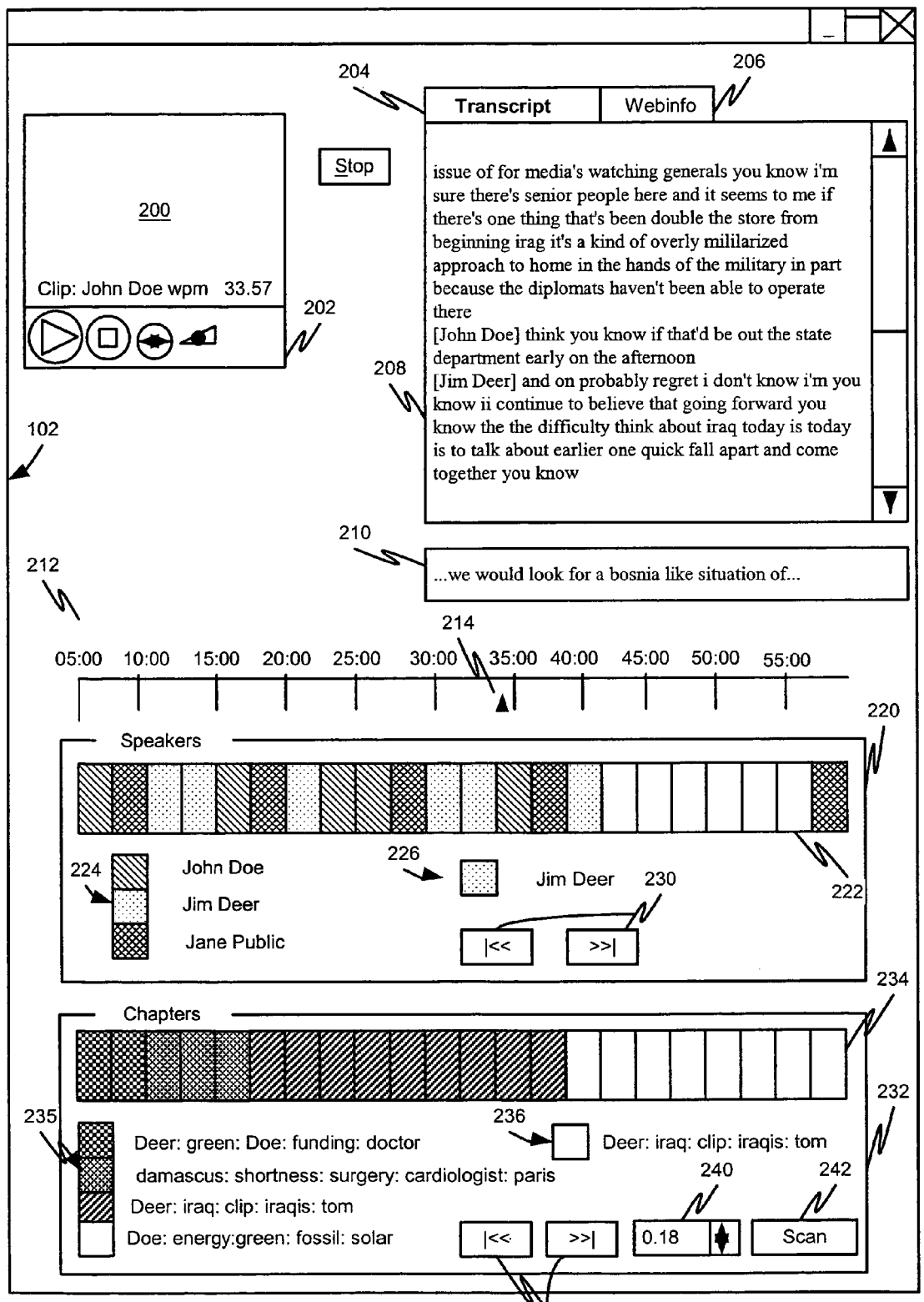
FIG. 2A is one exemplary user interface.

FIG. 2A illustrates one illustrative embodiment of a user interface 102 generated by A/V player 122, based on the metadata and A/V content in store 114. As shown in FIG. 2A, user interface 102 includes a screen area 200 which can be used to display the A/V content 104. User interface 102 also illustratively includes a control bar 202 that is used to control the playing of A/V content 104 in screen area 200. Control bar 202 may illustratively include such controls as forward, reverse, fast forward, scan, volume control, rewind, etc.

FIG. 2A also illustrates that user interface 102 includes a plurality of tabs 204 and 206. The web info under tab 206 illustratively corresponds to websites that are related to the A/V content stream 104 being displayed in display 200. It can also illustratively include search results, etc. A number of different web info components are discussed below with respect to FIG. 6.

In the embodiment shown in FIG. 2A, however, tab 204 has been actuated and a corresponding text field (or text box) 208 displays speech recognition results corresponding to the A/V content currently being played on screen 200. For instance, the speech recognition results may be generated by content analyzer 106 in FIG. 1 and stored as metadata in store 114.

They are also tagged to the portion in the A/V content stream 104 from which they were generated. Then, as the A/V content 104 is played on screen 200, the speech recognition results corresponding to the audio portion of A/V content 104 being played are displayed (e.g., scrolled) in text box 208. In one illustrative embodiment, speakers are identified and stored as metadata in store 114 as well. Then, as the speakers change, the speakers are identified. It can be seen in text box 208 that speakers "Jim Deer" and "John Doe" are identified and a transcript of what they are saying is also shown.

User interface 102 shown in FIG. 2A also includes a closed caption box 210. In the event that A/V content 104 already has closed captioning metadata associated with it, the closed captioning text is displayed in closed caption box 210, as the A/V content 104 is played. Otherwise, box 210 can be used to display the transcript discussed above with respect to text box 208.

Figure 3:
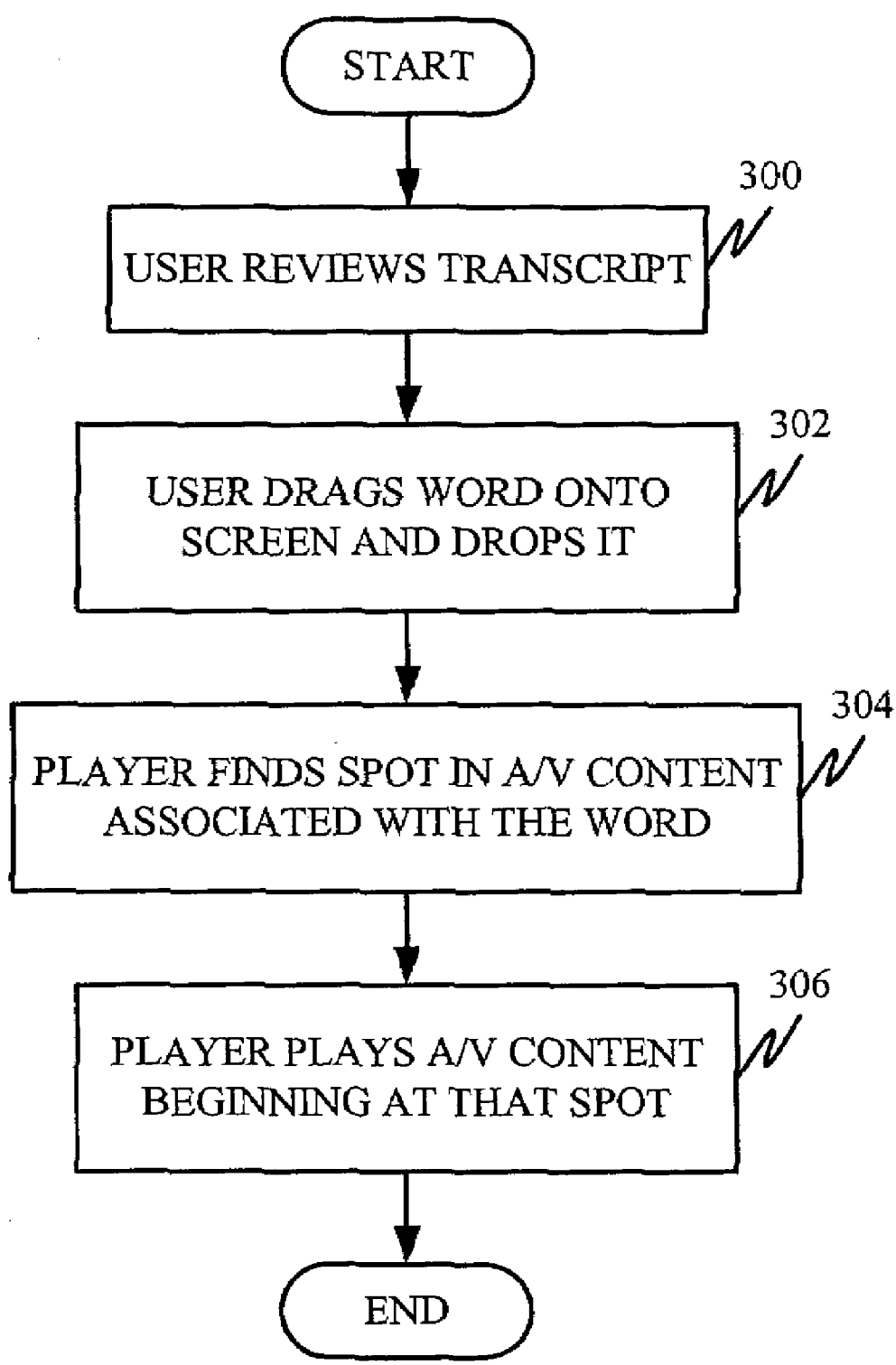
FIG. 3 is a flow diagram illustrating one illustrative way in which a user interacts with the A/V content based on speech recognition metadata.

FIG. 3 illustrates a flow diagram showing one illustrative user interaction with the user interface 102 shown in FIG. 2A. As discussed above, text box 208 contains the written transcript, generated by the speech recognizer in content analyzer 106, for the A/V content 104 currently being played on screen 200. In one illustrative embodiment, a user can easily scan the transcript in field 208 and decide on a relative part of the A/V content which the user wishes to view. Reviewing the transcript is indicated by block 300 in FIG. 3.

In one illustrative embodiment, a user can then simply highlight a portion of the transcript which the user finds of interest. This can be done in a number of ways. For instance, the user can right click over a word on the transcript, the user can highlight the transcript, or, in one embodiment, the user the can drag a word from the transcript in field 208 and drop it on screen 200. This is indicated by block 302 in FIG. 3.

Once the user has done this, player 122 illustratively locates the spot in the A/V content stream 104 that corresponds to the word in the recognized transcript in field 208. Recall that, as speech is recognized in the A/V content stream, the speech recognition results contain an identification as to where they were recognized in the A/V content stream. All this is stored in metadata store 114.

Therefore, player 122 finds the particular place in the A/V content stream 104 that corresponds to the selected word, and begins playing A/V content 104 at that place. Finding the associated spot within the A/V content stream is indicated by block 304, and playing the A/V content stream beginning at that spot is indicated by block 306 in FIG. 3.

The bottom half of user interfaced 102 shown in FIG. 2A illustrates a number of other user interactive features which can be generated using the metadata in store 114. In one illustrative embodiment, user interface 102 includes a time bar 212. Time bar 212 has incremental time displays along the top of bar 212 that indicate a beginning and end, and intermediate points, within the A/V content 104 being displayed on screen 200. A marker 214 is also shown along time bar 212. Marker 214 indicates what part of the A/V content stream is currently being displayed on display 200. It can be seen that, in the embodiment shown in FIG. 2A, the A/V content stream currently being displayed is approximately 57 minutes long, and the portion currently being played is at approximately 34 minutes into the A/V content stream 104.

In one illustrative embodiment, time bar 212 can be manipulated by the user. In other words, the user can illustratively select marker 214 by clicking on it with the cursor, for instance, and move it along time bar 212 to any desired point. When the user releases marker 214 on the time bar 212, A/V player 122 will skip to that time point in the A/V content stream 104 and being playing the A/V content stream 104 at that point.

User interface 102 shown in FIG. 2A also has a speaker section 220. Speaker section 220 illustratively includes a speaker identifier bar 222 and a legend 224, along with a current speaker identifier 226. The speaker identifier bar 222 is correlated to the time bar 222. Therefore, bar 222 indicates where, within the A/V content stream 104, the various speakers which have been identified, are speaking. Current speaker identifier 226 identifies the speaker that is currently speaking in the A/V content stream being displayed on display 200. It can therefore be seen that, by moving marker 214, the user can also move to a portion of the A/V content stream in which a given speaker is speaking.

Speaker section 220 also includes navigation buttons 230. Navigation buttons 230 allow the user to skip forward to a next speaker in the A/V content stream, or to skip backward to a previous speaker.

User interface 102 in FIG. 2A also includes a chapter section 232. Chapter section 232 illustratively includes a chapter bar 234 and a legend 235. The chapter bar 234 indicates where, in the A/V content stream 104, the various chapter boundaries reside. Legend 235 includes a brief summary that indicates, in one illustrative embodiment, the speaker, and a brief summary of the content of the speech spoken by that speaker, for a given chapter. A current chapter indicator 236 is also shown in FIG. 2A. Indicator 236 identifies the current chapter that is being played on screen 200. Buttons 238 allow the user to skip forward or backward to a next chapter, or to a previous chapter, respectively.

User interface 102 also shows a confidence level selector 240. Recall that in the discussion with respect to FIGS. 1 and 2, chapter analyzer 108 calculates a score for each proposed chapter boundary. The score indicates how confident chapter analyzer 108 is that the proposed chapter boundary is actually a chapter boundary. By increasing selector 240, the confidence level of the displayed chapters in chapter section 232 increases. Similarly, by decreasing selector 240, the confidence level decreases. As the confidence level increases, only those chapter boundaries for which the confidence level is high will be displayed. As it decreases, of course, additional chapter boundaries will be displayed, even those with a relative low confidence level. Thus, the selector 240 allows the user to select the granularity of the chapters. If the user desires to have a very large number of chapters displayed, the user can simply lower the confidence level to its lowest level. If the user desires to have fewer chapters, but those which are more distinct in subject matter, for example, then the user can simply increase the confidence level and fewer chapters will be displayed.

User interface 102 also illustratively includes a scan button 242. Scan button 242 allows the user to scan a relatively short portion of each chapter. For instance, if the user actuates the scan button, player 122 will illustratively play the first 5-10 seconds from each chapter, and then automatically move to the next chapter where it plays the first 5-10 seconds of that chapter, and so on.

FIG. 4 is a block diagram illustrating one embodiment of a content analyzer 106 in more detail. Content analyzer 106 shown in FIG. 4 includes audio analyzer 320 and natural language processor 322. Audio analyzer 320 can include components such as a speech recognizer, an audio event detector, that detects events such as speech or silence, or even content events such as screams, gunshots, automobile crashes, etc. Analyzer 320 can also include a music detector that detects the presence of music, a language detector that detects a language being spoken, etc. For the present discussion, analyzer 320 will be described in terms of a speech recognizer and a speaker identifier. This is not to be limiting in any way, however.

FIG. 5 is a flow diagram illustrating one illustrative embodiment of the operation of content analyzer 106 shown in FIG. 4. In one embodiment, audio analyzer 320 first receives A/V content 104. Analyzer 320 recognizes words and outputs them as recognition results 400, and also identifies groups of speakers and outputs them as speaker clusters 402. Performing automatic speech recognition on A/V content 104 is indicated by block 450 in FIG. 5. In one embodiment, analyzer 320 includes a simple classifier used to pre-process the speech in the A/V content 104. Therefore, during speech recognition, A/V content 104 is simply classified into regions that contain speech and regions that do not contain speech. Segmenting the content into speech and non-speech is indicated by block 452 in FIG. 5. Analyzer 320 then recognizes words in the A/V content 104 and outputs an automatically derived transcript of those words as recognition results 400. This can be done, for instance, using a large vocabulary automatic speech recognition system, or any other desired type of speech recognizer. Analyzer 320 also aligns the recognized words with the A/V content 104, such that each word in the transcript is aligned with a specific time point in the A/V content 104. Aligning the words with the A/V content is indicated by block 454 in FIG. 5. As indicated above with respect to FIG. 2A, this provides a quick mechanism by which a user can browse the speech content of A/V content 104 and jump to a designated spot within the A/V content stream.

Analyzer 320 then generates speaker segmentation. In one illustrative embodiment, analyzer 320 identifies acoustic similarity between segments of speech in A/V content 104 and clusters the speech content according to its acoustic similarity. Audio analyzer 320 thus clusters segments of speech into a plurality of clusters wherein each cluster belongs to a single speaker. Speaker segmentation can be performed, in one illustrative embodiment, using bottom-up agglomerative clustering, but the particular way clustering is performed is not important. Clustering the speakers based on acoustic similarity is indicated by block 456 in FIG. 5.

Audio analyzer 320 then locates speaker names in the recognition results 400. Based upon the speaker names, audio analyzer 320 can identify which clusters belong to which speakers. For instance, where closed captioning is provided, the speaker names can be easily associated with clusters. Otherwise, the names of the speakers are often mentioned during speech. Analyzer 320 can simply use the names mentioned (such as during introductions or at other points in the A/V content stream) to identify which speakers correspond to which clusters. Similarly, where prior audio content is annotated to identify speakers, speaker models can be trained so that speakers can be identified by acoustic or linguistic or other characteristics. This information can also be input through the community interface 124 discussed in more detail below. Locating speaker names in the automatic speech recognition output and assigning speaker names to speaker clusters 402 is indicated by block 458 in FIG. 5.

The speech recognition results 400 are then provided to natural language processor 322. Natural language processor 322 performs natural language analysis on speech recognition results 400. This is indicated by block 460 in FIG. 5, and can be done for a variety of different reasons. For instance, natural language processor 322 can be used in segmenting A/V content 104 into topic segments. This is shown by block 404 in FIG. 4 and generating the topic segmentation is indicated by block 462 in FIG. 5. This can be merged with the chapter analysis function described above, or provided as an input to that function.

It will also be noted that natural language processor 322 can be used with other or additional inputs other than only speech recognition results 400. For instance, processor 322 can use acoustic features such as speaking rate variation and changes in number and duration of silence or non-speech segments, or hesitation words across the segment boundary. It can also use speaker cluster information 402.

Natural language processor 322 can also identify factoids 407 in the A/V content 104. Factoids 407 are normally discrete facts cited in the content, which are relatively confined and which are not long enough to constitute a summary. Some exemplary factoids are described below with respect to FIG. 8, and identifying the factoids is indicated by block 463 in FIG. 5.

Natural language processor 322 can also generate summaries of various portions of A/V content 104. For instance, summaries can be generated for each chapter, or for each speaker, or for desired temporal increments of A/V content 104. Generating the summaries is indicated by block 464 in FIG. 5 and the summaries are illustrated by block 406 in FIG. 4.

Figure 6:
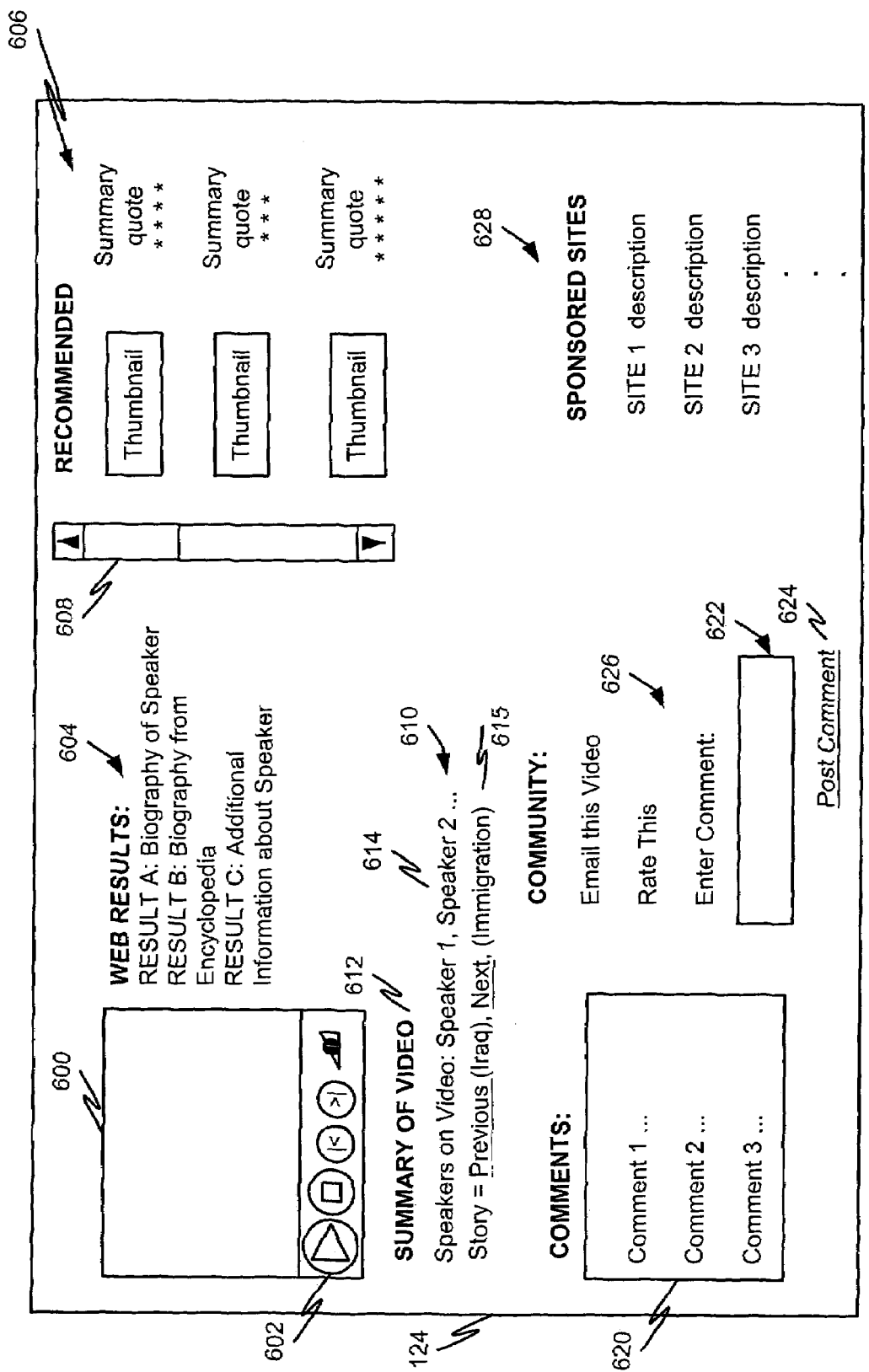
FIG. 6 is one exemplary user interface.

FIG. 6 is another illustrative embodiment of a user interface, which includes a community user interface 124 shown in FIG. 1. User interface 124 includes a screen 600 with a control bar 602. Screen 600 is used to show A/V content 104 and control bar 602 is used to control that content. User interface 124 is also shown having a web result section 604. The web result section 604 illustrates search results conducted by search engine 112 in FIG. 1 that are pertinent to the A/V content currently being displayed on screen 600. For instance, the web results 604 shown in FIG. 6 are all related to the speaker who is currently speaking on the A/V content being shown on screen 600. The results can include, for instance, biography information, on-line encyclopedia information, or any other additional information about the speaker. Of course, the web results 604 can also be related to the subject matter of the content being displayed as well, or related to any other aspect of the content being displayed. Web results 604 can illustratively include the textual results, or links to other content identified in the web results.

In one embodiment, to obtain web results 604, a two step approach is followed, although other approaches can be used as well and the two step approach is exemplary only. In the first step, the keywords (130 in FIG. 1) are extracted from A/V content 104 and provided to search engine 112 (which can be a web search engine). In the second step, the results obtained from search engine 112 are matched against the A/V content of interest (from which the keywords 130 were derived) and possibly re-ranked according to relevance based on a detailed match against the A/V content. The detailed match can be performed by considering any desired relevance criteria. Also, where a detailed match is made against an entire collection of documents, the first step (of searching those documents based on keywords)_ can be omitted. This may be the case where the collection of documents is relatively limited (such as to a collection of news stories, for instance) so that the relevance of each document in the collection can be determined.

User interface 124 also has a "recommended" section 606. Recommended section 606 illustratively includes other recommended A/V content that is related to the A/V content being displayed on screen 600. In the embodiment shown in FIG. 6, each of the recommended items of content include a thumbnail photograph identifying some aspect of the recommended content, such as the speaker. Each item of content may also illustratively include a summary, a quote from the A/V content which is somewhat indicative of the A/V content and a community rating (indicated by the stars) indicating how high members of the community rated that item of A/V content.

In one embodiment, in order to generate recommendations of related A/V content, the system can use metadata associated with that content. If available, the system can also use speech recognition transcripts or community generated metadata. In addition, in order to locate recommendations (or web results 604), a search can be performed using query expansion techniques known in information retrieval. In one embodiment, the related content can be ranked using any known techniques such as tf*idf or probabilistic latent semantic analysis.

Also, in the embodiment shown in FIG. 6, the recommended section 606 includes a scroll bar 608. The recommended items may be more numerous than those shown on user interface 124. In that case, scroll bar 608 can be used to scroll through the thumbnails, and other information related to the recommended items of A/V content.

Below screen 600 is a summary section 610. Summary section 610 illustratively includes a short textual summary of the A/V content being displayed. This is indicated by 612. Summary section 610 also illustratively includes a list of the speakers that speak in the A/V content being displayed on screen 610. This is indicated by block 614. Similarly, summary section 610 may illustratively include "previous" and "next" buttons that allow the user to skip to the previous or next story in the A/V content being displayed. The story boundaries can illustratively correspond to chapter boundaries and be delineated by subject matter. In addition, the previous and next buttons also illustratively include a textual segment 616 that indicates what the previous or next story is about. Therefore, for instance, in the embodiment shown in FIG. 6, the previous button has a textual segment "Iraq" indicating that the previous story is about Iraq, while the next button has a textual segment "Immigration" indicating that the next story is about immigration.

FIG. 6 also shows that user interface 124 illustratively includes a "comments" section 620. Comments section 620 contains comments entered by a community of users. The comments are related to the A/V content being displayed on screen 600. In the embodiment shown in FIG. 6, there are three textual comments entered, and each will illustratively include a sentence or paragraph written by a community member. User interface 124 also illustratively includes a comment entry section 622. Comment entry section 622 is illustratively a text box that allows a user to enter a comment by simply typing the comment into the text box. When the user actuates the "post comment" button 624, the comment typed into the comment field 622 is tagged to that point of the A/V content 104 that is currently being displayed on screen 600. Therefore, when the A/V content is again displayed, when that point of the A/V content is displayed on screen 600, the comment entered by the user in box 622 will appear in the comments field 620. The community section also includes a number of other features which allow the user to send the A/V content by electronic mail, or rate the A/V content. This is generally indicated at 626 in user interface 124.

Figure 6A:
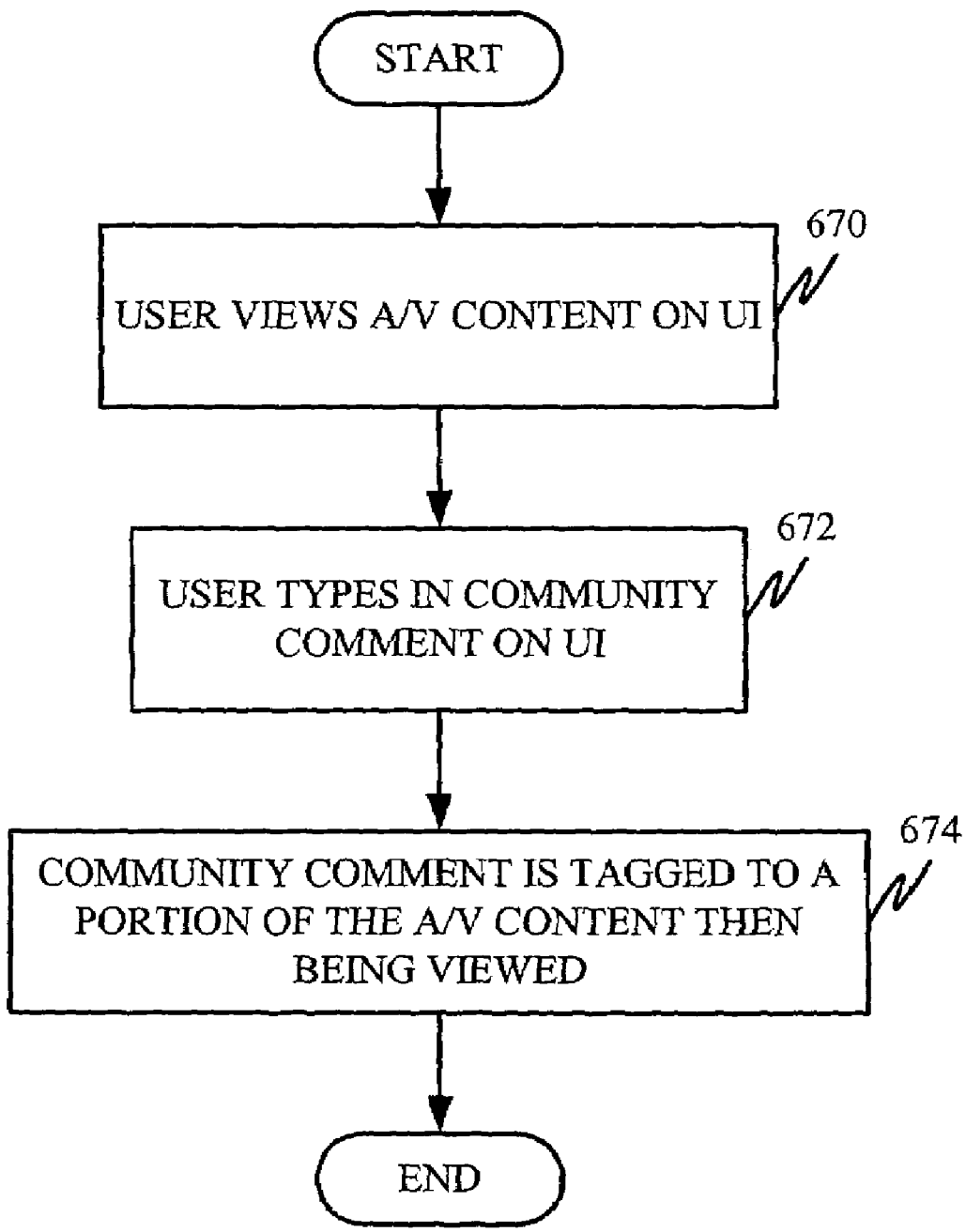
FIG. 6A is a flow diagram illustrating one embodiment in which a user provides comments to a user interface.

FIG. 6A is a flow diagram illustrating one embodiment of how a user can enter a comment in more detail. First, the user simply views the A/V content on user interface 104. This is indicated by block 670. When the user decides to type a comment, the user simply enters the comment into text box 622 on user interface 124. This is indicated by block 672.

When the user actuates the post comment button 624, the community comment which the user just entered is tagged to a portion of the A/V content then being displayed on screen 600. This is indicated by block 674. The comment is stored as community metadata.

Further, in the embodiment shown in FIG. 6, user interface 124 also includes a sponsored site section 628. These are sites that illustratively purchase space on the user interface 124 and are sponsors of the user interface. Therefore, they illustratively include hyperlinks to sites desired by the sponsors. The advertisements can be sensitive to the A/V content being displayed. Therefore, they can be selected for display from an inventory of possible advertisements based on any number of things such as similarity with the A/V content, the payment associated with the advertisement for display to the user or active user interaction with the advertisement, and collaborative filtering or other user-specific data which indicates a probability of user interest in the advertisement.

Figure 7:
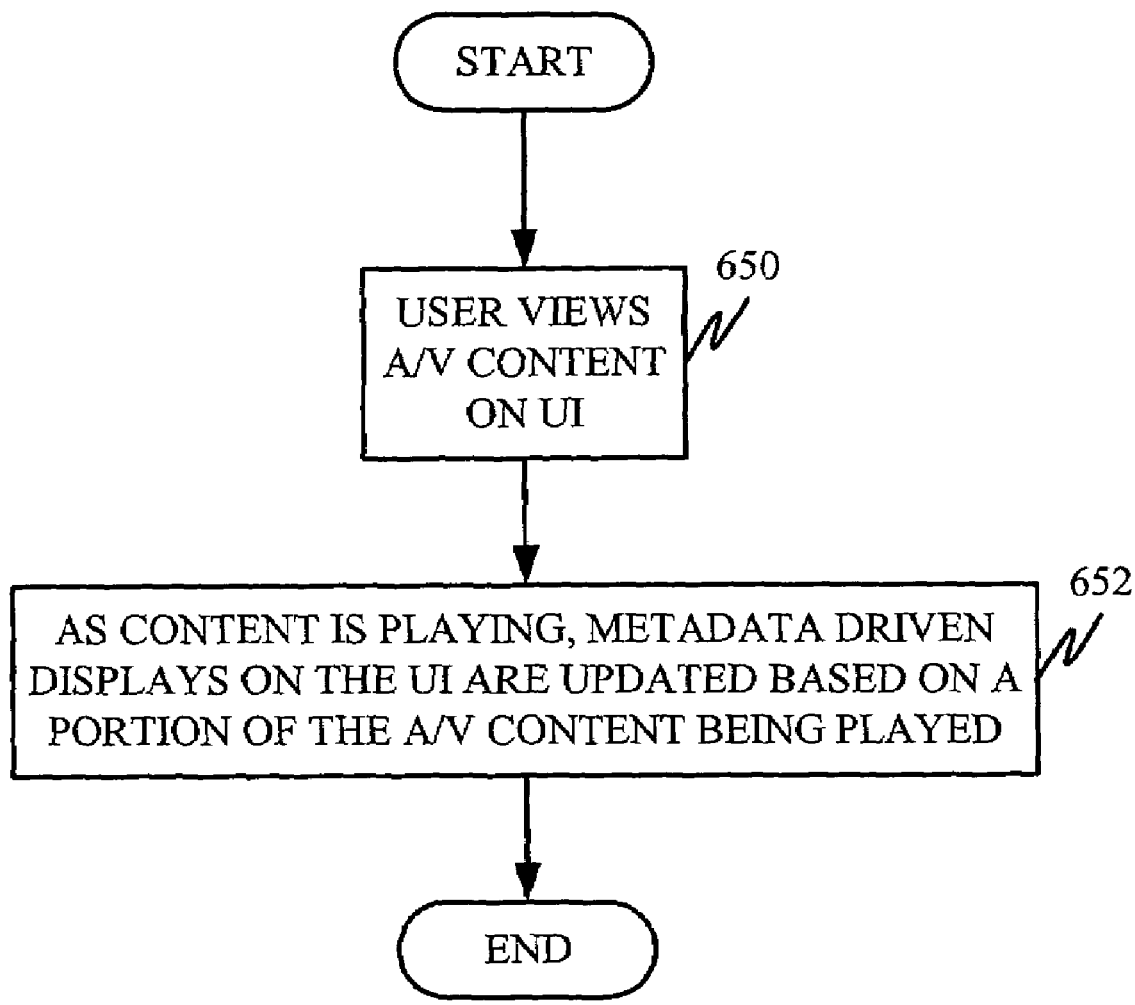
FIG. 7 is a flow diagram illustrating another embodiment in which the user interface is updated based on the metadata.

It will be noted that, in one embodiment, as the A/V content is played on screen 600, the metadata displayed on user interface 124 will update based on the particular point of the A/V content 104 that is being displayed. This is better illustrated by the block diagram shown in FIG. 7. The user first selects A/V content for viewing, and begins viewing it using the controls on control bar 602. This is indicated by block 650 in FIG. 7.

As the content is playing on screen 600, the metadata driven displays in the various other sections of user interface 124 are updated based on a point in the A/V content stream that is currently being played. This is indicated by block 652 in FIG. 7. For example, as the A/V content is being played, the web results section 60,4 may be updated to give information pertinent to different speakers or stories, as the speakers or stories in the A/V content change. Similarly, as the subject matter of the A/V content being played changes, the recommended section 606 is updated to show other A/V content that is related to the subject matter of the A/V content then being displayed. Similarly, as the A/V content is displayed on screen 600, the comment section 620 is updated to display the comments which were entered by community members as they were viewing that portion of the A/V content.

Of course, the metadata driven displays can be updated in a variety of different ways. For instance, they can be updated based on chapter boundaries, based on speaker changes, based on topic segmentation, or a combination of those. In addition, different portions of the metadata driven displays can be updated based on different metadata. For instance, the comments section 620 might be updated simply based on the time offset into the A/V content stream that is currently being displayed. The web result section 604 may be updated based on chapter boundaries or speaker segmentation. The recommended section 606 may be updated based on topic segmentation, etc. These are given by way of example only, and are not intended as limitations.

Figure 8:
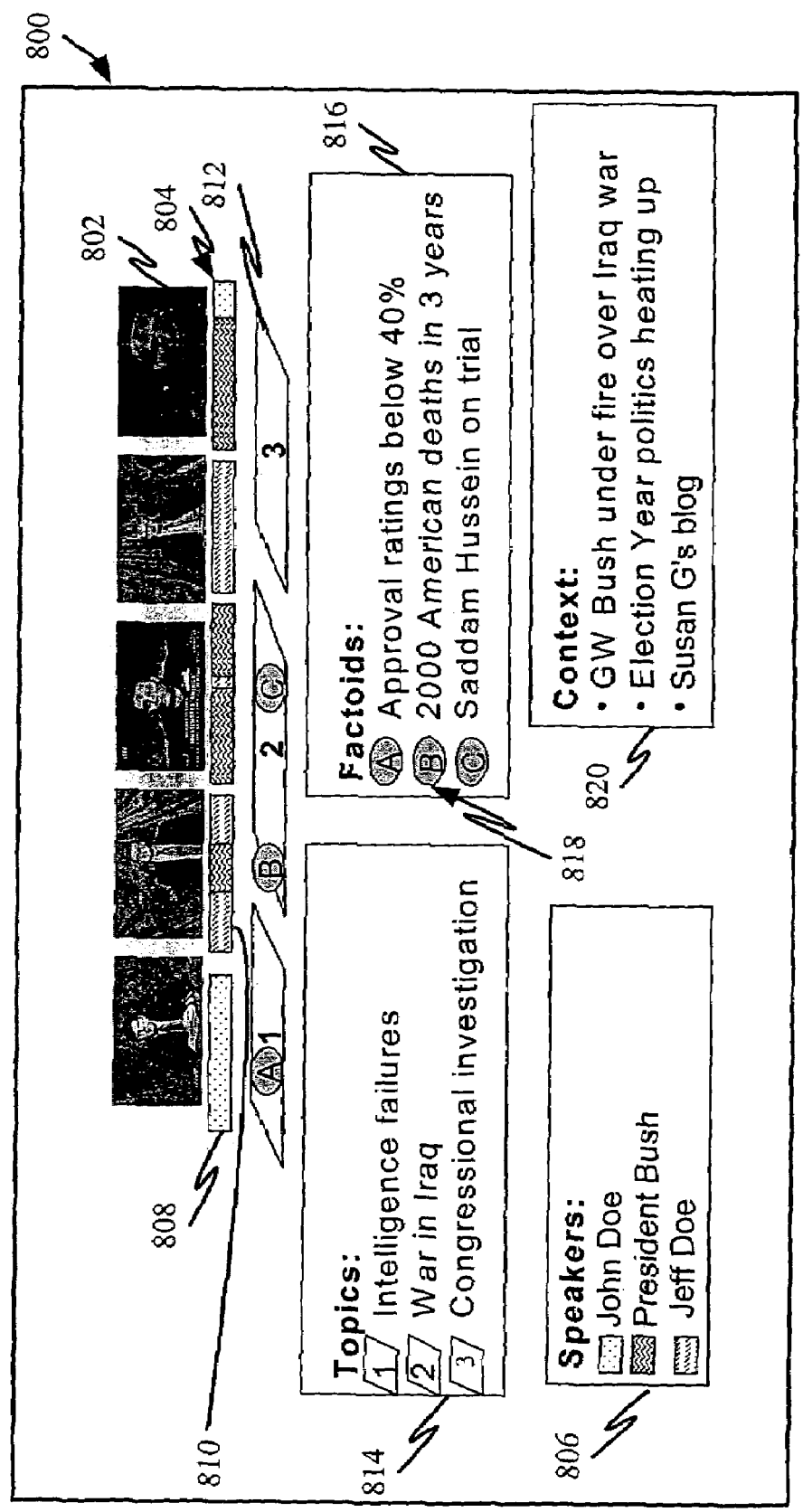
FIG. 8 is one exemplary user interface.

One other example of a user interface (such as 102 or 124) is shown in FIG. 8 and is separately numbered as user interface 800. User interface 800 includes a thumbnail section 802 which illustratively includes a plurality of different thumbnail photographs that represent, in some way, a portion of the A/V content 104. In the embodiment shown in FIG. 8, the thumbnails might simply be photographs of different speakers who are speaking in the A/V content.

Beneath the thumbnail section 802 is a speaker indicator section 804. While the thumbnail 802 may illustratively show a predominant speaker during that portion of the A/V content, the speaker identifier portion 804 identifies all speakers that speak during that portion of the A/V content. Legend 806 can be used to identify which different speaker occurs within that portion of the A/V content, and approximately where in the A/V content that speaker speaks. For instance, in the first speaker indicator portion 808 associated with a first thumbnail 802, there is only one speaker and that speaker is John Doe. In the second speaker indicator portion 810, however, there are two speakers. They are President Bush and Jeff Doe. It can be seen from the indicator 810 that Jeff Doe speaks for a short time during approximately the center time of that portion of the A/V content associated with the second thumbnail.

User interface 800 also includes a subject matter section 812. Subject matter section 812 has a corresponding topic index 814 that can be used to identify the topic, or subject matter, being discussed during the corresponding portion of the A/V content. For instance, during the portions of the A/V content corresponding to the first two thumbnails in section 802, intelligence failures are the primary topic of interest. During the portion of the A/V content associated with the second and third thumbnails in section 802, the war in Iraq is the primary topic of interest, etc.

User interface 800 also includes a factoid section 816. Factoid section 816 identifies factoids that are mentioned in A/V content 104. The factoids are each associated with a designator 818, and the designator appears on the topic section 812 at the point where the factoid is mentioned in the A/V content. Therefore, the factoid "approval ratings below 40 percent" appears in approximately the mid portion of the first topic section "intelligence failures".

User interface 800 shown in FIG. 8 also illustratively includes a context section 820. Context section 820 illustratively provides a very general overview of the context of the A/V content, which can be derived from the metadata generated for the A/V content.

It can thus be seen that the metadata driven displays on the user interface as discussed above allow a user to quickly gauge the overall relevance of a specific piece of A/V content. The user can even identify portions, within the A/V content, that are more relevant to the user than other portions of the same A/V content. Thus, the metadata driven display significantly enhances the user interface over prior systems which simply had conventional controls, such as start, stop, fast forward, and rewind.

Figure 9:
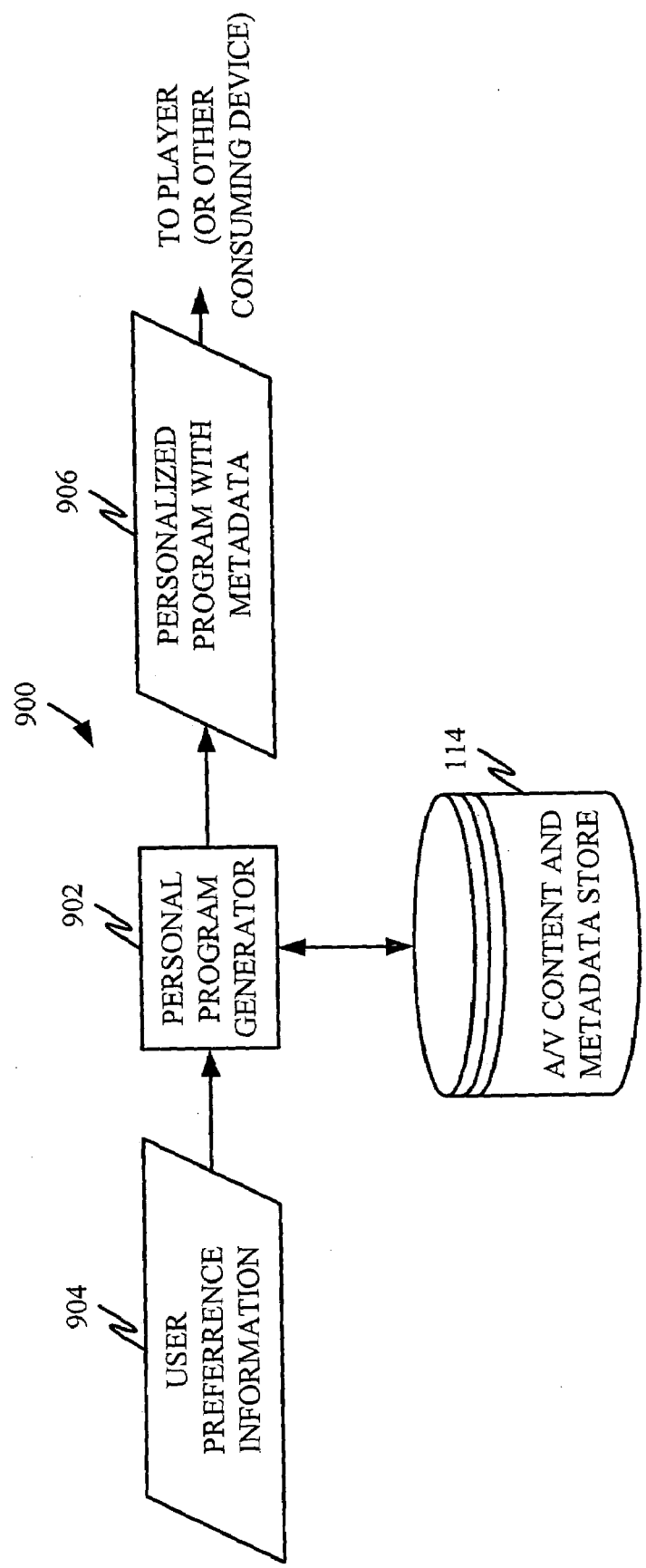
FIG. 9 is one illustrative block diagram of a personal program generation system.
Figure 10:
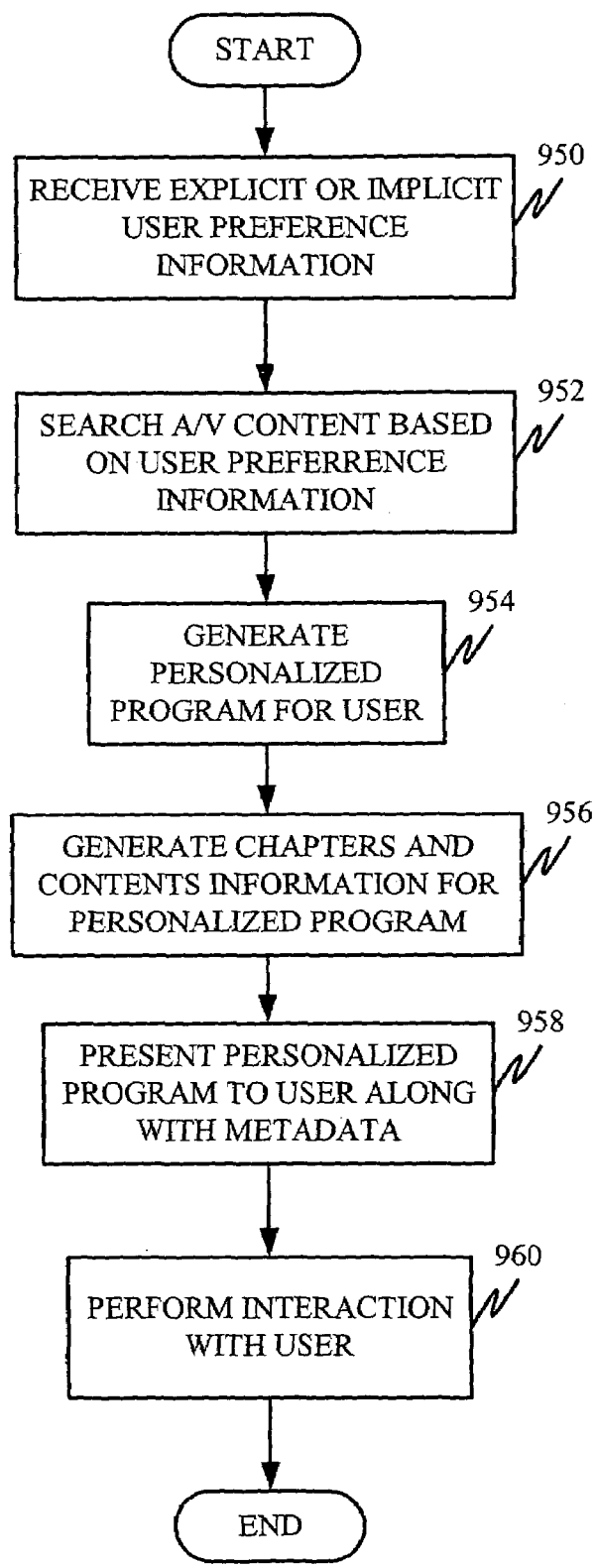
FIG. 10 is a flow diagram illustrating one illustrative embodiment of generating a personal program based on the automatically generated metadata.

In addition to enhancing the user interface in interacting with A/V content, the present system can also be used to generate personal programming for a user. FIG. 9 is block diagram of a personalized programming system 900 in accordance with one embodiment, and FIG. 10 is a flow diagram illustrating one embodiment of the operation of system 900 shown in FIG. 9. System 900 illustratively includes personal program generator 902 which is coupled to A/V content and metadata store 114.

In accordance with one embodiment, personal program generator 902 receives user preference information 904 from a user. The user preference information can either be explicit or implicit. Explicit user preference information may be, for example explicitly indicated topics of interest that are provided by the user. Implicit user preference information may be derived using collaborative filtering. For instance, other users that have selected similar A/V content for viewing may have common preferences. Those preferences can be learned by personal program generator 902 using collaborative filtering. In any case, receiving the user preference information 904 is indicated by block 950 in FIG. 10.

Personal program generator 902 then searches the items of. A/V content based on the user preference information. This is indicated by block 952. For instance, if the user preference information is topics of interest, or speakers of interest, or both, personal program generator 902 searches the A/V content in store 114 (and specifically the metadata generated for that A/V content) for the topics or speakers of interest (or for any other items identified in user preference information 904).

When generator 902 identifies pieces of A/V content that match the user preference information to a sufficient extent, those items of A/V content can be stitched together to generate a personalized program for the user. This is indicated by block 954 in the flow diagram of FIG. 10, and the personalized program along with its metadata, is indicated by block 906 in FIG. 9. Personal program generator 902 can also, of course, generate chapters and table of contents information for the personalized program 906. This can be appended to the metadata for the personalized program and output along with it. Generating this information is indicated by block 956 in FIG. 10. The personalized program 906 is then illustratively provided to a player (such as player 122 or another consuming device such as a television, mobile device, telephone, etc.) where it is presented, along with the metadata driven displays, to the user. This is indicated by block 958 in FIG. 10. The user can then perform various user interaction steps, as discussed above, through the metadata driven displays that are generated along with the personalized program 906. This user action is indicated by block 960 in FIG. 10.

Figure 11:
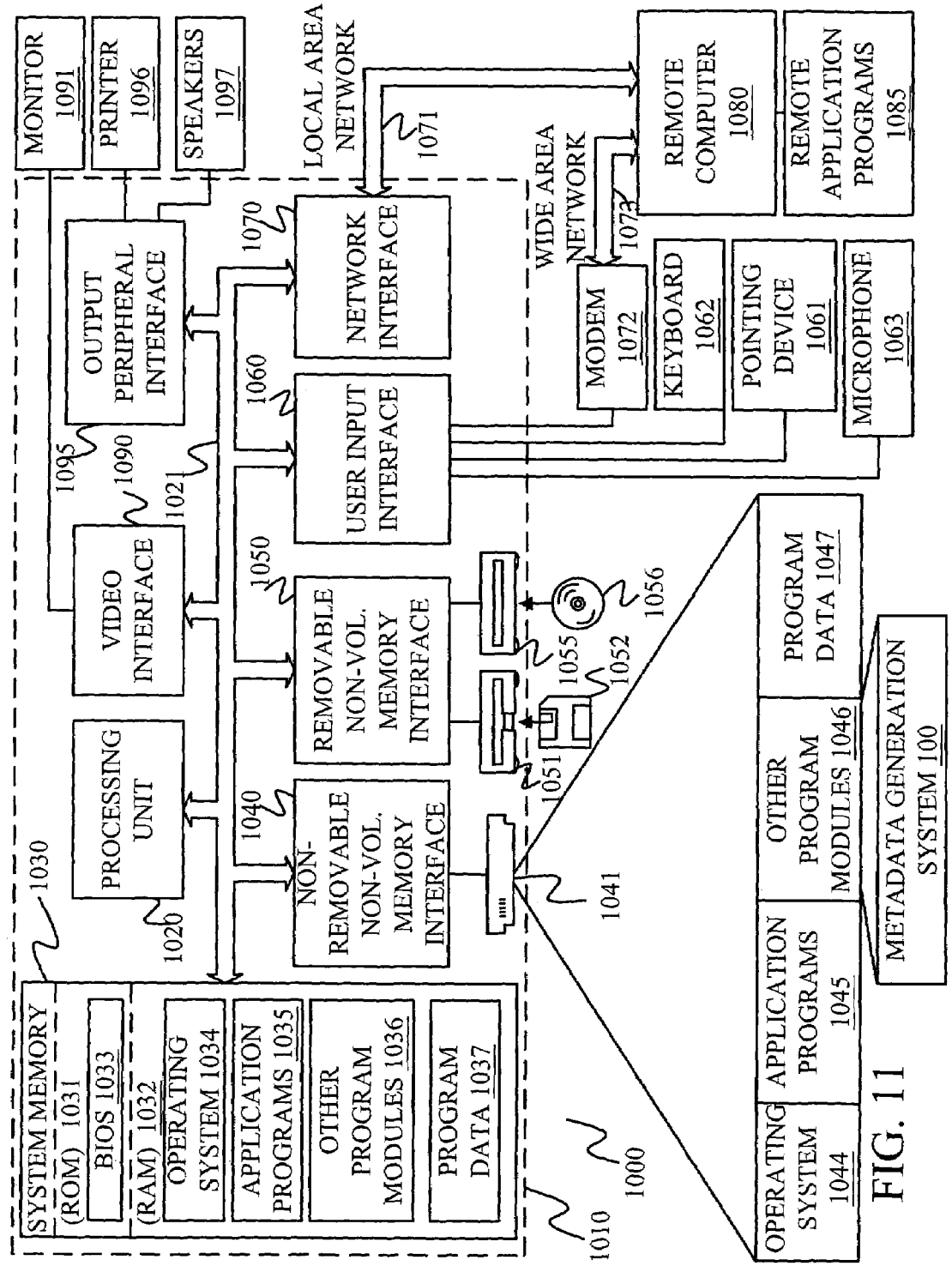
FIG. 11 is one illustrative block diagram of a computing environment in which the invention can be used.

FIG. 11 illustrates an example of a suitable computing system environment 1000 on which embodiments may be implemented. The computing system environment 1000 is only one example of a suitable computing environment and is not intended to suggest any limitation as to the scope of use or functionality of the claimed subject matter. Neither should the computing environment 1000 be interpreted as having any dependency or requirement relating to any one or combination of components illustrated in the exemplary operating environment 1000.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 11, an exemplary system for implementing some embodiments includes a general-purpose computing device in the form of a computer 1010. Components of computer 1010 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1010 typically includes a variety of computer readable media. Computer readable media can be any available media that can be accessed by computer 1010 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1010. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 11 illustrates operating system 1034, application programs 1035, other program modules 1036, and program data 1037.

The computer 1010 may also include other removable/non-removable volatile/nonvolatile computer storage media. By way of example only, FIG. 11 illustrates a hard disk drive 1041 that reads from or writes to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through a non-removable memory interface such as interface 1040, and magnetic disk drive 1051 and optical disk drive 1055 are typically connected to the system bus 1021 by a removable memory interface, such as interface 1050.

The drives and their associated computer storage media discussed above and illustrated in FIG. 11, provide storage of computer readable instructions, data structures, program modules and other data for the computer 1010. In FIG. 11, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies. FIG. 11 shows that system 100 is in other program modules 1046. Of course, it could be used other places as well, including being distributed over one or more remove computers 1080.

A user may enter commands and information into the computer 1010 through input devices such as a keyboard 1062, a microphone 1063, and a pointing device 1061, such as a mouse, trackball or touch pad. Other input devices (not shown) may include a joystick, game pad, satellite dish, scanner, or the like. These and other input devices are often connected to the processing unit 1020 through a user input interface 1060 that is coupled to the system bus, but may be connected by other interface and bus structures, such as a parallel port, game port or a universal serial bus (USB). A monitor 1091 or other type of display device is also connected to the system bus 1021 via an interface, such as a video interface 1090. In addition to the monitor, computers may also include other peripheral output devices such as speakers 1097 and printer 1096, which may be connected through an output peripheral interface 1095.

The computer 1010 is operated in a networked environment using logical connections to one or more remote computers, such as a remote computer 1080. The remote computer 1080 may be a personal computer, a hand-held device, a server, a router, a network PC, a peer device or other common network node, and typically includes many or all of the elements described above relative to the computer 1010. The logical connections depicted in FIG. 11 include a local area network (LAN) 1071 and a wide area network (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060, or other appropriate mechanism. In a networked environment, program modules depicted relative to the computer 1010, or portions thereof, may be stored in the remote memory storage device. By way of example, and not limitation, FIG. 11 illustrates remote application programs 1085 as residing on remote computer 1080. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An audio/video (A/V) processing system, comprising:
an automatic content analyzer receiving A/V content and analyzing the A/V content using speech recognition and natural language processing to generate speech metadata and natural language metadata corresponding to the A/V content, the speech metadata including speaker identification metadata identifying speakers in the A/V content and a location in the A/V content that the identified speakers are speaking and the natural language metadata including subject matter metadata describing subject matter of segments of the A/V content and where in the A/V content the subject matter is mentioned, wherein the automatic content analyzer comprises an audio analyzer generating speech metadata by recognizing words in the A/V content and aligning the words with the A/V content, wherein the words comprise a transcription of the A/V content;
a player displaying a plurality of different metadata displays, the metadata displays displaying information based on the speech and the natural language metadata, the metadata displays including the speaker identification metadata, the subject matter metadata and the transcription, the metadata displays indicating where in the A/V content a speaker is speaking and where a subject matter is mentioned, wherein the player generates a user interface providing a user actuable input, actuable to select a speaker in the speaker identification metadata and either a word in the transcription, or a subject matter in the subject matter metadata, and to cause the player to begin playing the A/V content at a point in the A/V content that is aligned with the selected speaker and either the selected word or the selected subject matter, the user interface including a thumbnail section, a speaker indicator section below the thumbnail section, and a legend, the legend identifying each of the speakers in the A/V content, the thumbnail section including a plurality of different thumbnail photographs, each of the plurality of different thumbnail photographs representing a predominant speaker in one of the A/V content segments, the speaker indicator section identifying all the speakers that speak during the A/V content and approximately where in the A/V content each speaker speaks; and
a computer processor, being a functional component of the A/V processing system, activated by the automatic content analyzer to facilitate analyzing of the A/V content.

2. The A/V processing system of claim 1 wherein the automatic content analyzer is configured to segment the A/V content based on the speech metadata and the natural language metadata, wherein the metadata displays include a display of the segments, wherein the user interface provides a user actuable input, actuable to select a segment of the A/V content for display and to cause the player to begin displaying the A/V content at the selected segment, and wherein the user interface includes a subject matter section having a topic index, the topic index identifying a topic or subject matter being discussed during segments of the A/V content.

3. The A/V processing system of claim 1 wherein the automatic content analyzer comprises a chapter analyzer identifying chapter boundaries in the A/V content based on the speech metadata and the natural language metadata and calculating a confidence score for each chapter boundary, and wherein the user interface includes a factoid section that identifies factoids that are mentioned in the A/V content, the factoids representing discrete facts cited in the A/V content, the factoids being associated with designators on a topic section of the user interface.

4. The A/V processing system of claim 3 wherein the user interface comprises a user actuable granularity selector and a context section, the user actuable granularity selector actuable to adjust a number of chapter boundaries displayed based on the confidence scores for each chapter boundary, the content section providing an overview of a context of the A/V content, the context being derived from the metadata generated for the A/V content.

5. The A/V processing system of claim 2 wherein the automatic content analyzer comprises:
a natural language processor configured to generate summaries of different segments of the A/V content as the natural language metadata.

6. The A/V processing system of claim 2 wherein the automatic content analyzer comprises a keyword identifier configured to identify keywords in each segment.

7. The A/V processing system of claim 6 wherein the automatic content analyzer comprises a search engine configured to identify related information, related to a segment of the A/V content, based on the keywords identified in the segment, and wherein the metadata displays include at least the related information or a link to the related information.

8. The A/V processing system of claim 2 wherein the user interface includes an input mechanism configured to receive community metadata corresponding to the segments in the A/V content, and wherein the metadata displays comprise a community metadata display displaying information indicative of the community metadata, the information displayed by the community metadata display changing as different segments of the A/V content are displayed.

* * * * *